Patented Mar. 16, 1943

2,313,767

UNITED STATES PATENT OFFICE 2,313,767

HYDROLYSIS OF ALLYL HALIDES

Maxwell A. Pollack, Akron, and Albert G. Chenicek, Barberton, Ohio, assignors to Pittsburgh Plate Glass Company, Allegheny County, Pa., a corporation of Pennsylvania No Drawing. Application November 22, 1940, Serial No. 366,727

4 Claims. (Cl. 260—640)

This invention relates to the production of unsaturated alcohols from unsaturated halides and is particularly directed to the preparation of allyl and methallyl alcohols from allyl and methallyl chlorides respectively. According to United States Letters Patent No. 2,072,015 and No. 2,072,016, it is known that allyl chloride and allyl type chlorides may be hydrolyzed by treatment with water and a basic acting agent at a temperature above about 80° C. and under superatmospheric pressure, and it is stated in this patent that upon using lower temperatures, the rate of reaction is undesirably low.

The use of high pressure and temperatures is objectionable since loss of allyl alcohol due to formation of the ether or to polymerization may occur. Moreover, the cost of hydrolysis in such a process is comparatively high since the pressure equipment required is expensive.

In accordance with the present invention, we have found that allyl type or other unsaturated halides may be hydrolyzed at substantially lower temperatures by conducting the hydrolysis in the presence of a suitable wetting agent capable of reducing the surface tension of the aqueous medium. Alternatively, it is found that if higher temperature is resorted to, the rate of hydrolysis is found to be substantially more than when no wetting agent is used. Moreover, the present invention permits treatment of halides such as allyl chloride under atmospheric pressure, thus eliminating necessity for pressure equipment.

While the present invention is particularly directed to the preparation of allyl and methallyl alcohol from the corresponding chlorides, other unsaturated halides wherein the halogen is attached to a saturated carbon atom may be treated. For example, other allyl type halides which contain the characteristic group

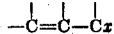

where $x$ is halogen, such as chlorine, bromine, or iodine, may be treated in this manner. Thus, crotyl chloride, allyl, methyl allyl or ethyl allyl chloride or other unsaturated chloride or the corresponding dichloro compounds such as 2-chloroallyl chloride, chloro crotyl chloride, etc. may be treated in accordance with the present invention. In addition, the invention may be applied to the treatment of halide mixtures containing allyl type halides and vinyl type halides which contain the group

where $x$ is halogen. Thus, the reaction mixture obtained by chlorination by allylic substitution of propylene, butylene, isobutylene, amylene, etc., or by dehydrochlorination of propylene, dichloride, butylene dichloride, etc. may be treated in accordance with this invention.

The reaction is conducted in an aqueous medium in the presence of a suitable agent capable of reducing the surface tension of the aqueous medium, such as sodium oleate, sulphuric or sulphonic esters of aliphatic alcohols such as hexyl, lauryl, or octyl sulphate, or the corresponding esters of secondary alcohols such as 2 hydroxy-5 nonane, aryl or aralkyl sulphonates, or sulphonic acids such as isopropyl naphthalene sulphonic acid, phenol sulphonic acid, benzene sulphonic acid or the sodium salts thereof, Turkey red oil, alkylol amines, such as mono-, di- or triethanol amine, etc. The amount of surface tension reducing agent required is capable of some variation but in most cases should not be present in large quantities. Generally, sufficient agent is used to reduce the surface tension of the aqueous medium below about 50 to 60 dynes per centimeter. 0.1 to 0.5 percent has been found suitable for most purposes.

In accordance with our invention, the reaction may be conducted in a vertical column by introducing gaseous or liquid halide into the base of the column which is filled with an aqueous alkaline solution heated to the desired temperature. The allyl chloride reacts as it is mixed in the column. However, if the reaction is incomplete, unreacted allyl chloride may escape as a vapor from the top of the column. This may be avoided by placing a condenser at exit end of the column and collecting the unreacted chloride and reintroducing it at the base of the column. Aqueous solution containing allyl alcohol may be withdrawn from the column continuously or intermittently from the top or bottom of the column. Alternatively, the solution may be allowed to become more and more concentrated by introduction and hydrolysis of further amounts of allyl or other halide and alkali whereby a solution having a concentration upward of 10% or more, preferably about 15–20% is obtained.

In order to conduct the process continuously, it is often desirable to operate at a temperature sufficiently high to cause vaporization of a constant boiling mixture of water and the alcohol produced. Thus, in treating allyl chloride, the temperature may be maintained at about 85° C. or above. In such a case, alkali, water and allyl chloride may be introduced into the reaction zone continuously or intermittently and allyl alcohol vaporized while maintaining at all times a reaction mixture comprising water, basic agent, allyl type halide and allyl type alcohol, wherein the hydrolysis may be conducted. During such process a substantial quantity of sodium chloride, or other salt may form and precipitate. This may be removed by permitting the precipitated salt to settle and withdrawing it from the base of the chamber. Alternatively, portions of the reaction liquid may be withdrawn continuously or intermittently and filtered or otherwise treated to remove suspended salts and the clarified liquor returned to the mixture.

The invention is preferably conducted in the presence of a basic reacting agent such as basic metal oxides, hydroxides, or carbonates, or non-metallic bases such as quaternary ammonium bases. Suitable basic agents include the following: alkali metal compounds such as sodium bicarbonates, carbonates, or hydroxides, potassium carbonate, bicarbonate or hydroxide, zinc oxide or hydroxide, aluminum hydroxide, basic zinc carbonate, alkaline earth metal carbonates or hydroxides such as calcium, barium or strontium carbonates or hydroxides, magnesium hydroxide, tetramethyl ammonium hydroxide or triphenyl methyl ammonium hydroxide. If desired, a salt of a strong acid such as the sodium or potassium salts of oxalic, maleic, fumaric, sulphuric, or other strong acid may be introduced with or in lieu of the alkali.

Due to the presence of the wetting agent it is possible to conduct the reaction at temperatures substantially below 80° C., for example, 50 to 70° C., or below. Nevertheless, in some cases, it may be desirable to heat the reaction mixture to a somewhat higher temperature in order to increase the rate of reaction. Temperatures in excess of 200 to 250° C., however, are considered objectionable in view of other reactions which occur.

The following examples are illustrative:

Example I

A solution of 42 grams of 95% sodium hydroxide in 358 grams of water (10% solution containing 0.5% Nekal A (an alkyl naphthalene sodium sulphonate)) was placed in an externally-heated vertical glass tube. The solution was heated to 63-80° C. and allyl chloride was introduced at the bottom of the reactor, which was designed in such a way that allyl chloride vapors which passed through the solution unreacted were condensed, collected and returned to the base of the tube to be recycled. A total of 51.0 grams (0.667 moles) of allyl chloride was introduced. After 3 hours, 84% of the allyl chloride had reacted, forming a solution containing 9% of allyl alcohol. In contrast, when no wetting agent was used, 9.3 hours were required to secure the same degree of reaction. The alcohol was recovered by fractionation.

Example II

In the recycling apparatus described in Example I was placed a solution of 53.0 grams (0.50 mole) of anhydrous sodium carbonate in 347 grams of water containing 0.4 gram of Nekal A. Allyl chloride (51.0 grams) was passed through the hot solution as before. After 6.3 hours at 68-84° C., 88% of the allyl chloride had reacted.

Example III

The experiment described in Example II was repeated using 60.4 grams of methallyl chloride. The reaction was carried out at 99-100° C. for 5.5 hours. The amount of chloride ion formed showed that 83% of the methallyl chloride had reacted. Of this amount 0.2% went to form methallyl ether and the rest to methallyl alcohol.

Although the present invention has been described with particular reference to the specific details of certain embodiments thereof, it is not intended that such details shall be regarded as limitations upon the scope of the invention except insofar as included in the accompanying claims.

We claim:

1. A method of preparing an unsaturated alcohol which comprises reacting at approximately atmospheric pressure and at a temperature not exceeding 100° C. an unsaturated halide, taken from the class consisting of allyl, methallyl, ethyl allyl and crotyl halides, with a basic acting agent in an aqueous medium containing a wetting agent present in amount sufficient to reduce the surface tension of the mixture to an amount not in excess of 60 dynes.

2. The method of claim 1 wherein the halide is allyl chloride and the temperature does not exceed 84° C.

3. The method of claim 1 wherein the halide is methallyl chloride.

4. A continuous method of preparing an unsaturated alcohol by hydrolysis which comprises reacting a mixture of water, an unsaturated halide taken from the class consisting of allyl, methallyl, ethyl allyl and crotyl halides, and a basic acting agent, at approximately atmospheric pressure and at a temperature, not in excess of 100° C., at which the halide is hydrolyzed, in the presence of a surface tension reducing wetting agent present in amount to maintain the surface tension of the mixture at not in excess of 60 dynes, and maintaining the method in substantially continuous operation by withdrawing as it is formed the alcohol produced by the reaction and water, and adding to the mixture to continue the reaction further amounts of water, the unsaturated halide and basic acting agent.

MAXWELL A. POLLACK.
ALBERT G. CHENICEK.